United States Patent Office 3,210,420
Patented Oct. 5, 1965

3,210,420
HALOAROMATIC AMIDES OF PROPIOLIC ACID
Lee A. Miller, Kirkwood, Mo., assignor to Monsanto Company, a corporation of Delaware
No Drawing. Filed Dec. 18, 1961, Ser. No. 160,296
6 Claims. (Cl. 260—562)

This application is a continuation-in-part of my copending application Serial No. 77,485, filed December 22, 1960, and now abandoned.

The present invention relates to nitrogenous acetylenic compounds and more particularly provides a new and valuable class of propiolic acid derivatives and the method of preparing the same.

According to the invention, haloaromatic amides of propiolic acid are provided by the condensation or propiolyl chloride with a primary or secondary haloaromatic amine, substantially according to the scheme:

$$\text{Hal-Ar-}\overset{Z}{\underset{|}{N}}\text{H} + \text{Cl}\overset{O}{\underset{\|}{C}}\text{C}\equiv\text{CH} \longrightarrow \text{Hal-Ar-}\overset{Z}{\underset{|}{N}}-\overset{O}{\underset{\|}{C}}\text{C}\equiv\text{CH} + \text{HCl}$$

wherein Ar is selected from the class consisting of aromatic hydrocarbon radicals of from 6 to 12 carbon atoms wherein such radicals carry one or more halogen substituents, and Z is selected from the class consisting of hydrogen and alkyl radicals of from 1 to 5 carbon atoms.

The halogenated aromatic primary or secondary amines such as the following can be used to prepare useful products: the isomeric monochloroanilines, the isomeric dichloroanilines, the isomeric monobromoanilines, the isomeric dibromoanilines, the isomeric N-methyl-monochloroanilines, the isomeric N-methyl-dichloroanilines, e.g. N-methyl-2,3-dichloroaniline, N-methyl-2,4-dichloroaniline, N-methyl-2,5-dichloroaniline, N-methyl-3,4-dichloroaniline, N-methyl-3,5-dichloroaniline, the isomeric N-methyl-dibromoanilines, the isomeric monofluoroanilines, the isomeric monoiodoanilines, the isomeric trichloroanilines, the various isomeric tribromoanilines, tetrachloroaniline, pentachloroaniline, the isomeric N-alkyl-dihaloanilines, wherein the alkyl radical has from 1 to 5 carbon atoms, and the two halo substituents can be the same or different halogens, and the isomeric N-alkyl-trihaloanilines wherein the alkyl radical is as defined above and the three halogen substituents can be the same or different. All of these halogenated aromatic primary or secondary amines react readily with propiolyl chloride, according to the invention, to give good yields of the haloaromatic propiolamides. Thus, 4-chloroaniline and propiolyl chloride give 4-chloropropiolanilide:

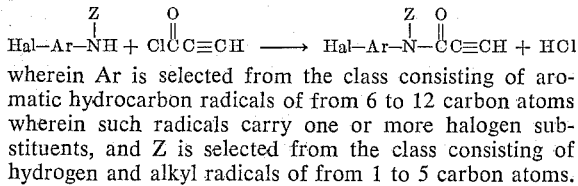

Examples of other aromatic propiolamides provided by the invention and the amines from which they are prepared by condensation with propiolyl chloride are shown below:

2-, 3- or 4-bromopropiolanilide or chloropropiolaniline from 2-, 3- or 4-bromoaniline or chloroaniline.
2,3-, 2,4-, 2,5-, 2,6-, 3,4-, or 3,5-dichloropropiolanilide from 2,3-, 2,4-, 2,5-, 2,6-, 3,4- or 3,5-dichloroaniline.
Iodopropiolanilide from 4-iodoaniline.
Ethyl 2,3 - difluoro - 4 - propiolylaminobenzoate from ethyl 2,3-difluoro-4-aminobenzoate.
2,3-dichloro-4-nitropropiolanilide from 2,3-dichloro-4-nitroaniline.
Pentachloropropiolanilide from pentachloroaniline.
N-(β-chloro-α-naphthyl)propiolamide from β-chloro-α-naphthylamine.
Ethyl (α-propiolylamino) - β - naphthalenecarboxylate from ethyl α-amino-β-naphthalenecarboxylate.
N-butyl-2-chloro-4-nitropropiolanilide from N-butyl-2-chloro-4-nitroaniline.
2-butyryl-3-chloro-4-ethoxypropiolanilide from 2-butyryl-3-chloro-4-ethoxyaniline.
N-(2,4-dichloro-1-naphthyl)propiolamide from 2,4-dichloronaphthylamine.
N-(2,4-dibromo-1-naphthyl)propiolamide from 2,4-dibromonaphthylamine.
N-(dichloro-2-biphenylyl)propiolamide from dichloro-2-biphenylamine.
N-(tribromo-3-biphenylyl)propiolamide from tribromo-3-biphenylamine.

The propiolyl chloride used in the present reaction is obtained by reacting propiolic acid with benzoyl chloride. The reaction between benzoyl chloride and propiolic acid is almost instantaneous at ambient temperature and being an equilibrium reaction it is desirable to remove one of the product materials during the course of the reaction in order to shift equilibrium in the desired direction. In this respect propiolyl chloride is relatively more volatile than other materials in the reaction mass and for that reason the temperature of reaction is controlled to cause vaporization of the propiolyl chloride during the course of the reaction. The preparation of propiolyl chloride according to this procedure forms the subject of the copending application of Lee A. Miller, Serial No. 6,344, filed February 3, 1960, and now abandoned. The propiolyl chloride so formed may be led directly, without intermediate recovery, into a solution or suspension of the haloaromatic amine which is to be employed according to this invention.

Reaction of the haloaromatic amine with the propiolyl chloride takes place readily by simply contacting the chloride with the amine at ordinary or increased temperature and in the presence of an inert diluent or solvent. Optimum conditions include operation at temperatures which may be as low as, say, —10° C., i.e., extraneous heating is generally unnecessary; instead, because the reaction is usually exothermic, cooling may be employed. The ratio of acyl halide to the haloaromatic amine which is employed will, of course, depend upon the number of amino groups in the amine which it is desired to react, and it is advantageous to employ the reactants in such stoichiometric proportion. However, a slight excess of either the amine or the acyl halide may be used.

A preferred method of operation comprises a gradual addition of the propiolyl chloride into a solution of the haloaromatic amine in an inert solvent or diluent at a temperature which may be at or below room temperature. In initial runs it is recommended that addition of the halide be made into a cooled solution of the amine, and that the reaction mixture be allowed subsequently to attain room temperature gradually. In some instances it

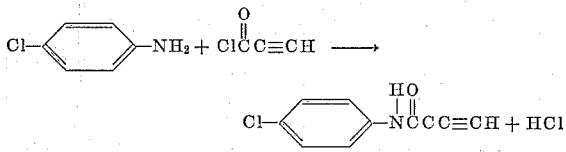

may be necessary to employ extraneous heat in order to complete the reaction.

Since the reaction is accompanied by the evolution of hydrogen chloride as by-product, it may be advantageous to provide for removal of the hydrogen chloride from the reaction zone. This can be done by dephlegmation and venting with rapid stirring, or by operating in the presence of a basic material as hydrogen halide scavenger, e.g., the alkali and alkali metal oxides or hydroxides, or basically reacting salts thereof such as sodium, potassium, lithium, rubidium, cesium, calcium, or magnesium hydroxide, carbonate or acetate. Conveniently, an excess of the amine component is employed for this purpose.

A solvent or diluent, though not necessary, is also recommended. This is because in the exothermic reactions it serves to dissipate heat of reaction and because, irrespective of the temperature conditions, use of the solvent or diluent minimizes a tendency of the hydrogen halide by-product to react with the triple bond of the initial propiolyl chloride and of the propiolamide product. In this connection, it is often advantageous to select the solvent or diluent on the basis of being less compatible with or having the poorest solvency for hydrogen chloride. Useful solvents for this purpose are generally the aromatic hydrocarbons or halohydrocarbons, e.g., benzene, xylene, chlorobenzene, etc. Also advantageously employed are the cycloalkanes, e.g., cyclohexane, cyclopentane or the alkyl-substituted cycloalkanes. Other presently-useful solvents include, e.g., hexane, acetone, ethyl ether, dioxane, etc.

The presently-provided haloaromatic propiolamides are stable, well-characterized compounds which are usually crystalline solids. They are advantageously employed for a variety of industrial and agricultural purposes, e.g., as hardening agents in synthetic rubber manufacture processes; as hypnotics and soporifics in the pharmaceutical industry and as toxicant compositions effective in preventing or inhibiting the growth of fungi and bacteria.

The haloaromatic propiolamides of the invention are of great interest per se for the synthesis of an extensive number of organic compounds. The acetylenic bond in the propiolamide is very useful in syntheses not only owing to the reactivity which generally accompanies unsaturation but also owing to the activating effect of the amide radical on the acetylenic bond. Compounds containing reactive hydrogen thus add across the triple bond of the presently-provided propiolamides to give olefinic amides having a substituent at the terminal carbon atom. Thus, reaction of, say, 3,4-dichloropropiolanilide with a hydroxy compound such as, say, ethanol, gives 3,4-dichloro-(3-ethoxyacryloyl)anilide. Halo(acryloyl)anilides having various substituents at the 3-position of the acryloyl radical are thus obtained by employing, instead of ethanol, other compounds having a reactive hydrogen, e.g., phenol, thiophenol, aniline, butyric acid, thiolacetic acid, etc.

The acetylenic bond of the presently-provided propiolamides is readily halogenated or hydrogenated to give either the fully saturated or olefinically unsaturated amides, depending upon the reaction conditions. The olefinic amides thus obtained undergo vinyl-type polymerization to give homopolymers of high molecular weight and copolymerize with other unsaturated compounds. Accordingly, to one skilled in the art of organic synthesis, the presently-provided propiolamides are building materials of great potential.

The invention is further illustrated by, but not limited to, the following examples:

*Example 1*

To a mixture consisting of 4.5 g. (0.05 mol) of propiolyl chloride in 50 ml. of benzene there was added dropwise with stirring over a period of 1 hour a solution consisting of 16.5 g. (0.102 mol) of 3,4-dichloroaniline in 100 ml. of benzene. An additional 50 ml. of benzene was then added to the rather thick reaction mixture and the whole was stirred for 3 hours and subsequently allowed to stand overnight. It was poured into 200 ml. of water, extracted twice with ether, and the ether extracts were washed twice with water and dried over anhydrous magnesium sulfate. Concentration of dried extracts gave a tan solid which upon twice repeated crystallization from benzene gave 10.3 g. (94.5% theoretical yield) of the substantially pure 3,4-dichloropropiolanilide, M.P. 180–181° C., coarse, tan crystals, which analyzed as follows:

|  | Found | Calc'd for $C_9H_5ONCl_2$ |
| --- | --- | --- |
| Percent C | 50.58 | 50.49 |
| Percent H | 2.46 | 2.35 |
| Percent N | 6.04 | 6.54 |
| Percent Cl | 32.86 | 33.13 |

*Example 2*

This example shows testing of the 3,4-dichloropropiolanilide of Example 1 against the bacteria *Staphylococcus aureus*.

A 1% acetone solution of the test compound was prepared and added to sterile, melted, nutrient agar to give a concentration of one part of the test compound per million parts of agar. The agar solution of the test compound was then poured into a Petri dish and allowed to harden. This plate, as well as duplicate controls (plates of sterile nutrient agar containing the same concentration of acetone but none of the test compound) were respectively inoculated with the *Staphylococcus aureus* and incubated for 2 days at 37° C. At the end of that time, inspection of the plates showed no growth of the test bacteria on the plate which contained the one part per million concentration of the 3,4-dichloropropiolanilide, whereas profuse growth of the test organism was noted on the controls.

*Example 3*

This example shows testing of the 3,4-dichloropropiolanilide of Example 1 against the fungus *Aspergillus niger*.

An inoculum preparation of *Aspergillus niger* SN–111 was prepared by adding 10 ml. of sterile distilled water to a 7-day old, Sabouraud's dextrose agar slant culture thereof and dislodging the spores into the water with a transfer needle.

Culture media was prepared by respectively adding 18 ml. of Sabouraud's dextrose agar to 18×150 mm. straight side test tubes, capping wtih metal culture tube caps, and sterilizing in an autoclave for fifteen minutes at 121° C.

A stock solution of the test compound was prepared by dissolving 100 mg. of the compound in 10 ml. of acetone; a 1% acetone solution of the compound was thus obtained.

Using a sterile 5 ml. pipette, 2 ml. of said 1% solution was respectively transferred to a tube of melted, sterile culture media prepared as described above. Dilutions of 1 part of test compound per 1,000 parts of agar resulted. Dilution was thus repeated until a concentration of one part of test compound per 100,000 parts of agar was obtained. The thus-diluted agar was then poured into a sterile Petri dish and allowed to harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in that plate which contained the 1:100,000 concentration of the 3–4-dichloropropiolanilide, whereas profuse growth of the *Aspergillus niger* was noted in both of the "control" plates.

Example 4

The 3,4-dichloropropiolanilide of Example 1 was tested against the fungus *Alternaria solani* (the causal organism of tomato blight). The testing was conducted by spraying to run-off, four uniform Bonny Best tomato plants at the 4–5 leaf stage with an 0.03% aqueous emulsion of the dichloropropiolanilide, allowing the sprayed plants to dry, subsequently inoculating the plants with said tomato fungus, maintaining the thus sprayed and inoculated plants in a moisture chamber at 70° F. for 36 hours, and finally removing them to a greenhouse bench and periodically inspecting the plants for incidence of the disease during a five-day period. At the end of this time, the plants were observed to be fluorishing and free of disease, whereas controls, i.e., plants which had not been sprayed but had been similarly inoculated and maintained, were disease-ridden.

Example 5

The 3,4-dichloropropiolanilide of Example 1 was tested against the soil fungus *Rhyizoctonia solani*. Testing was conducted by adding to soil, which had been uniformly infected with the fungus, a quantity of the dichloropropiolanilide equivalent to 0.01% the weight of the soil. After thorough mixing and incubating at 25° C. for 24 hours, pots of the incubated soil were seeded with cotton and cucumber seeds. The seeded pots were maintained for 48 hours at 70° F. and at a high relative humidity (96–98%) and then removed to the greenhouse. After two weeks under greenhouse conditions the pots were inspected to determine the number of seedlings that emerged and the condition of their shoots and roots. A similar testing procedure was conducted with controls, i.e., similarly inoculated soil which had not been chemically treated. A very poor percent emergence and a stunted, diseased condition of those of the plants which emerged were noted in the controls, whereas excellent germination and plant growth were observed in the pots of inoculated soil which had been treated with the dichloropropiolanilide.

The presently-provided propiolamides may be applied directly to the bacteria or fungi to be combatted, e.g., by spraying, or they may be applied to plants or other locale, in a manner so as to function either as a preventive or therapeutic agent in advance of an anticipated infection. Dust, emulsion, or solution formulations may be employed for such application; furthermore, adhesive and wetting agent additives may be employed in the compositions to assist in the distribution thereof on the surfaces to be protected from the pests. The concentrations of the presently-provided propiolamides which are employed in bacteriostat or fungistat formulations will depend on the particular propiolamide which is used and the specie to be attacked; a typical formulation, for example, may contain from 0.0001% to 0.1% of active ingredient, with the balance being a small quantity of a wetting agent and an inert carrier such as water, an inert organic liquid, or a dust such as talc or pumice. Effective concentrations for use under particular circumstances may be readily determined by those skilled in the art.

What I claim is:

1. A haloaromatic propiolamide of the formula

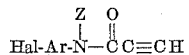

wherein Hal represents at least one halogen atom attached to the aromatic nucleous, Ar represents an aromatic hydrocarbon nucleus selected from the group consisting of phenyl, naphthyl, and biphenyl and Z is selected from the class consisting of hydrogen and alkyl groups of from 1 to 5 carbon atoms.
2. 3,4-dichloropropiolanilide.
3. 2,3-dichloropropiolanilide.
4. 2,4-dichloropropiolanilide.
5. 2,5-dichloropropiolanilide.
6. 3,5-dichloropropiolanilide.

References Cited by the Examiner

UNITED STATES PATENTS

| | | | |
|---|---|---|---|
| 2,722,497 | 11/55 | Newcomer | 167—30 |
| 2,817,622 | 12/57 | Obladen et al. | 167—30 |
| 2,967,886 | 1/61 | Shapiro et al. | 260—562 |
| 2,969,392 | 1/61 | Schaeffer | 260—562 |
| 2,978,465 | 4/61 | Jerchel | 260—562 X |

OTHER REFERENCES

Grob: Helv. Chim. Acta, volume 39, pages 417–22 (1956).

Viehe: Chemische Berichte, volume 92, page 1952 (1959).

WALTER A. MODANCE, *Primary Examiner.*

IRVING MARCUS, DUVAL T. McCUTCHEN,
*Examiners.*